United States Patent
Maly et al.

(10) Patent No.: US 6,410,624 B1
(45) Date of Patent: Jun. 25, 2002

(54) TIRE WITH TREAD OF NOVEL POLYMER BLEND INCLUDING STYRENE-RICH STYRENE/ISOPRENE/BUTADIENE SEGMENTED TERPOLYMER

(75) Inventors: Neil Arthur Maly; Paul Harry Sandstrom, both of Tallmadge; Wen-Liang Hsu, Cuyahoga Falls; Adel Farhan Halasa, Bath, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/395,446

(22) Filed: Sep. 14, 1999

(51) Int. Cl.⁷ .................................................. C08K 5/24
(52) U.S. Cl. ...................... 524/262; 524/505; 525/236; 525/237; 525/241
(58) Field of Search .......................... 529/420; 524/262, 524/505; 525/236, 237, 241

(56) References Cited

U.S. PATENT DOCUMENTS 4,748,168 A * 5/1988 Kawakami et al. ......... 524/474
5,326,810 A * 7/1994 Muraki et al. .............. 524/496

* cited by examiner

Primary Examiner—Peter D. Mulcahy
(74) Attorney, Agent, or Firm—Henry C. Young, Jr.

(57) ABSTRACT

Rubber compositions comprised of novel blends of segmented styrene-rich styrene/isoprene/butadiene terpolymer elastomer and at least one additional elastomer and tires with treads comprised of such rubber composition. Such tires may exhibit increased traction and reduced rolling resistance.

24 Claims, No Drawings

TIRE WITH TREAD OF NOVEL POLYMER BLEND INCLUDING STYRENE-RICH STYRENE/ISOPRENE/BUTADIENE SEGMENTED TERPOLYMER

FIELD

This invention relates to rubber compositions comprised of novel blends of styrene-rich segmented styrene/isoprene/butadiene terpolymer elastomer and at least one additional elastomer and to tires with treads comprised of such rubber composition. Such tires may exhibit increased traction and reduced rolling resistance.

BACKGROUND

Pneumatic rubber tires conventionally have treads of various elastomer based compositions which are subject, under operating conditions, to considerable dynamic distortion and flexing as well as abrasion due to, for example, skidding and scuffing as is well known to those having skill in such art.

Historically, a tire tread may be composed of, for example, one or more elastomers such as, for example, cis 1,4-polyisoprene, cis 1,4-polybutadiene and styrene/butadiene (SBR) copolymers. Where enhanced traction of the tread is desired, elastomers such as, for example, 3,4-polyisoprene or SBR polymers might be utilized in the tread rubber blend, depending somewhat upon the overall choice of elastomers for the tire tread.

Historically, where enhanced abrasion resistance is desired, cis 1,4-polybutadiene rubber may be a component of the tire tread rubber composition. It is believed that such utilization of such elastomers is well known to those having skill in such art.

For this invention, a novel elastomer blend is desired to enhance, or promote, a tire tread's traction.

In the description of this invention, the terms "compounded" rubber compositions and "compounds", where used refer to the respective rubber compositions which have been compounded with appropriate compounding ingredients such as, for example, carbon black, oil, stearic acid, zinc oxide, silica, wax, antidegradants, resin(s), sulfur and accelerator(s) where appropriate. The terms "rubber" and "elastomer" may be used interchangeably. The amounts of materials, or ingredients, for a rubber composition are usually expressed in parts of material per 100 parts of elastomer by weight (phr).

DISCLOSURE AND PRACTICE OF THE INVENTION

In accordance with this invention, a rubber composition is provided which is comprised of, based upon 100 parts by weight rubber (phr), (A) about 25 to about 75 phr of styrene-rich segmented styrene/isoprene/butadiene terpolymer elastomer comprised of styrene/butadiene segments and polyisoprene segments and, correspondingly, about 25 to about 75 phr of at least one additional elastomer selected from at least one of cis 1,4-polyisoprene, styrene/butadiene copolymer, styrene/isoprene copolymer and 3,4-polyisoprene.

It is preferred that the SBR segments are styrene-rich segments which contain about 20 to about 50, alternately about 25 to about 45, weight percent bound styrene. Accordingly, the terpolymer preferably contains from about 15 to about 35, alternately about 20 to about 30, weight percent bound styrene.

In practice, it is preferred that the content of the styrene/butadiene (SBR) copolymer segments is in a range of about 15% to about 50% of the terpolymer and, correspondingly, the content of the polyisoprene segments is in a range of about 85% to about 50% of the terpolymer.

In practice, it is preferred that said segmented styrene/isoprene/butadiene terpolymer is characterized by having two Tg's, namely a first Tg in a range of about +10 to about −30° C. and a second Tg in a range of about −50 to about −70° C. Accordingly, the first and second Tg's are spaced apart by at least 20° C. Because of the significant spatial difference between the two Tg's, it is considered herein that the SBR and the polyisoprene segments of the terpolymer are substantially incompatible with each other.

It is considered herein that the relative incompatibility of segments within the terpolymer is significant because it allows each polymer segment to provide its inherent individual property to the segmented polymer. Accordingly, the styrene rich segment of the terpolymer is, thereby, able to more individually contribute to the traction aspect of the rubber composition.

In further accordance with this invention, such a rubber composition is provided which contains about 20 to about 120 phr of reinforcing filler selected from (1) rubber reinforcing carbon black or (2) rubber reinforcing carbon black and amorphous silica where said carbon black is present in an amount of about 5 to about 80 phr, preferably about 30 to about 60 phr and the amorphous silica is present in an amount of about 5 to about 80, alternatively about 15 to about 55, phr so long as the total of said carbon black and silica fillers is within the aforesaid range of about 20 to about 120, preferably about 35 to about 85 phr.

A significant aspect of this invention is the use of a segmented styrene/isoprene/butadiene terpolymer elastomer in a tire tread rubber composition, particularly together with one or more of cis 1,4-polyisoprene, styrene/butadiene copolymer, styrene/isoprene copolymer and 3,4-polyisoprene elastomers.

Preferably the cis 1,4-polyisoprene rubber is natural rubber, although synthetic cis 1,4-polyisoprene rubber may usually be acceptable.

It is considered herein that use of a segmented styrene/isoprene/butadiene elastomer is particularly beneficial for promoting traction, or skid resistance, for a tire tread rubber composition because this polymer contains styrene-rich SBR segments that are chemically bound with high cis 1,4-polyisoprene segments (e.g. polyisoprene segments of about 80 percent cis 1,4-configuration).

In particular, for the relatively styrene-rich segmented styrene/isoprene/butadiene terpolymer elastomer, it is preferred that it is composed of about 20 to about 50 weight percent units derived from styrene, about 10 to about 50 weight percent units derived from isoprene and about 30 to about 70 weight percent units derived from 1,3-butadiene.

This aspect of the structure is considered herein to be important because it promotes the incompatibility of the SBR and polyisoprene segments to provide the desired cured rubber properties.

Silica reinforcement, where used, is conventionally used in conjunction with a coupling agent to couple the silica to the elastomer(s), thus, enhancing its effect as reinforcement for the elastomer composition. Use of coupling agents for such purpose is well known to those having skill in such art. The coupling agent typically has a moiety reactive with hydroxyl groups (e.g.: silanol groups) on the surface of the silica and another moiety interactive with the elastomer(s) to create the silica-to-rubber coupling effect.

For example, a coupling agent may be a bis-(3-trialkoxysilylalkyl) polysulfide where the polysulfide bridge contains an average of from about 2 to about 4, preferably from 2 to 2.6 or 3.5 to 4, connecting sulfur atoms. The alkyl groups may be selected, for example, from methyl, ethyl and propyl radicals. Exemplary of such coupler might be, for example, a bis-(triethoxysilylpropyl) polysulfide.

In further accordance with this invention, a pneumatic rubber tire is provided having at least one component as the said rubber composition.

In particular accordance with this invention, a pneumatic tire is provided having a tread of said rubber composition.

In practice, the segmented styrene/isoprene/butadiene terpolymer elastomer might be prepared, for example, by terpolymerizing the styrene, isoprene and 1,3-butadiene monomers in an organic solvent such as, for example, hexane, in the presence of a catalyst such as, for example n-butyllithium modified with TMEDA. The terpolymer is caused to be of a segmented configuration of styrene/butadiene copolymer segments and cis 1,4-polyisoprene segments, instead of a random configuration of styrene/isoprene/butadiene by sequential addition of first isoprene to create a relatively high cis 1,4-polyisoprene, (about 50 to about 90 percent cis 1,4 content), and then later the styrene and butadiene to create the segments.

It is readily understood by those having skill in the art that the rubber compositions would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur-vulcanized material (rubbers), the additives mentioned above are selected and commonly used in conventional amounts.

Typical additions of reinforcing carbon black have been hereinbefore discussed. Typical amounts of tackifier resins, if used, may comprise about 0.5 to about 10 phr, usually about 1 to about 5 phr. Typical amounts of processing aids may comprise 1 to 20 phr. Such processing aids can include, for example, aromatic, napthenic, and/or paraffinic processing oils. Silica, if used, has been hereinbefore discussed. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of unique blends of specialized elastomers in various tire components.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators are used in which the primary accelerator is generally used in the larger amount (0.5 to 2 phr), and a secondary accelerator which is generally used in smaller amounts (0.05–0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

A styrene/butadiene copolymer elastomer of random configuration is prepared by an organic solution polymerization of styrene and 1,3-butadiene monomers in a suitable reactor according to the following procedure. By the term "random configuration" it is meant that no five or more styrene repeating units are contained in each SBR polymer chain. The random or block styrene distribution was determined by NMR.

For this Example, 2240 grams of a hexane solution of styrene and 1,3-butadiene monomers, which had been dried to remove moisture over silica/alumina molecular sieves, was charged to a one-gallon (3.8 liters) reactor.

The hexane solution was composed of 19.7 weight percent of the styrene and 1,3-butadiene monomers and the weight ratio of styrene to 1,3-butadiene was 38/62.

An impurity content of the solution of 2 ppm was determined by titration with n-butyllithium using 2,2-dipyridine as the indicator.

To the solution in the reactor, taking into account the above impurity level, was then added 4.2 ml of TMEDA (N,N,N',N'-tetramethylethylene diamine) and 1.8 ml of a 1.03 M solution of n-butyllithium (n-BuLi), each in a hexane solution. The molar ratio of TMEDA to n-BuLi was 2.5/1 and the targeted number average molecular weight for the styrene/1,3-butadiene random copolymer was 275,000.

The copolymerization of the styrene and 1,3-butadiene monomers was carried out at about 70° C. for about 2 hours. A gas chromatographic analysis of residual monomers contained in the polymerization mixture indicated that the polymerization was essentially complete at this time. Then, 2 mil of one molar ethanol solution in hexane was added to shortstop the polymerization and the resulting copolymer was removed from the reactor and stabilized with one phm of an antioxidant. After an initial evaporation of hexane, the resulting copolymer was dried in a vacuum at about 50° C.

The resulting styrene/butadiene copolymer was determined to have a glass transition (Tg) temperature of about −22° C. by differential scanning calorimetry (DSC) at a heating rate (rate of rise in temperature) of 10° C. per minute.

It was determined, by proton NMR (Nuclear Magnetic Resonance) analysis that the copolymer, was composed of about 43 percent 1,2-polybutadiene units, about 19.5 percent 1,4-polybutadiene units and about 37.5 percent of random polystyrene units. The Mooney viscosity (ML-4) was determined to be 72 at 100° C.

It was determined that the copolymer had a random microstructure by Proton NMR analysis.

EXAMPLE II

A segmented styrene/isoprene/butadiene terpolymer elastomer composed of styrene/butadiene copolymer segments and cis 1,4-polyisoprene units was prepared by terpolymerizing styrene, isoprene and 1,3-butadiene monomers by organic solution polymerization according to this Example.

By the term "segmented" it is meant that two or more polymer chains or polymer segments are linked chemically. In this particular example, the first segment is polyisoprene and the second segment is styrene/butadiene copolymer (SBR). It is formed by making the first polyisoprene segment and then adding styrene and 1,3-butadiene monomers to the live ends of the pre-formed polyisoprene segment to form the second SBR segment.

For this Example, 600 grams of a hexane solution of isoprene, which had been dried to remove moisture over silica/alumina molecular sieves, was charged to a one-gallon (3.8 liters) reactor.

The hexane solution was composed of 19 weight percent of the isoprene monomer.

A 2 ppm impurity content for the monomer solution was determined by titration with n-butyllithium using 2,2-dipyridine as an indicator.

To the solution in the reactor, taking into account the above impurity level, was then added 1.5 ml of one molar solution of TMEDA (N,N,N',N'-tetramethylethylene diamine) in hexane.

The polymerization of the isoprene was carried out at about 65° C. until the isoprene monomer was consumed, which was about 90 minutes, thereby creating a live polyisoprene polymer which remained available for further reaction, or polymerization, upon introduction of additional suitable monomer.

For a second step in the polymerization process, an addition of 3 ml of one molar solution of TMEDA in hexane was added as a modifier to the reactor followed by an addition of 1,710 grams of styrene and 1,3-butadiene monomers in a hexane solution. The solution was composed of 20 weight percent of monomers and the styrene to butadiene ratio was about 36/64. The solution had been previously scavenged to remove impurities with n-butyllithium.

The polymerization was continued at about 65° C. until all of the monomers had been consumed, which took about 3 hours.

The polymerization was then shortstopped with an addition of ethanol and the resulting terpolymer was stabilized with an addition of about 1 phm (parts per hundred) of an antioxidant.

The recovered, segmented styrene/isoprene/butadiene terpolymer elastomer was determined to have a Mooney viscosity (ML-4) of about 73. It was determined by NMR analysis to contain 25 weight percent of units derived from the isoprene in the first segment and 75 weight percent of 36/64 units derived from styrene/butadiene (SBR) in the second segment.

Since the polyisoprene segment and the SBR segment were not compatible, as indicated by their two individual, separated, glass transition temperatures (Tg's) of −21° C. and −62° C., respectively, it was considered that the segmented terpolymer had a lamellar morphology. The morphology of the segmented terpolymer was determined using transition electron microscopy.

EXAMPLE III

Rubber compositions were prepared using, variously, the random solution styrene/butadiene copolymer elastomer (S-SBR) of Example I and the segmented styrene/isoprene/butadiene terpolymer (Segmented SIBR) of Example II as illustrated in the following Table 1 and Table 1A.

The rubber compositions are referred to herein as Samples A–E, with Samples A containing 75 phr SBR and B containing 75 phr segmented SIBR. For Samples C–E, various blends of segmented SIBR and SBR are shown.

A sequential two step mixing procedure comprised of one non-productive mix step followed by a productive mix step.

The non-productive mix step was conducted by mixing the ingredients in an internal rubber mixer to a temperature of about 160° C. for a period of about 2.5 minutes after which time the mixture was dumped from the mixer of milled for a short period of time on an open mill, sheeted out and allowed to cool to below about 30° C.

The productive mix step, where the curatives are added, was conducted by mixing the ingredients in an internal rubber mixer to a temperature of about 120° C. for a period of about 2.0 minutes after which time the mixture was dumped from the mixer of milled for a short period of time on an open mill, sheeted out and allowed to cool to below about 30° C.

TABLE 1

| | Mixing Procedure (Parts by Weight) | | |
| --- | --- | --- | --- |
| | Sample A Control | Sample B | Sample C |
| Non-Productive Mixing Step | | | |
| Synthetic PI[1] | 25 | 25 | 25 |
| SBR-HS rubber[2] | 75 | | 25 |
| SIBR-SEG rubber[3] | | 75 | 50 |
| Carbon black[4] | 45 | 45 | 45 |
| Antidegradants[5] | 3 | 3 | 3 |
| Processing oil[6] | 9 | 9 | 9 |

TABLE 1-continued

| | Mixing Procedure (Parts by Weight) | | |
|---|---|---|---|
| | Sample A Control | Sample B | Sample C |
| Stearic acid | 3 | 3 | 3 |
| Zinc oxide | 3 | 3 | 3 |
| Wax[7] | 1 | 1 | 1 |
| Productive Mixing Step | | | |
| Sulfur | 1.6 | 1.6 | 1.6 |
| Acclerators[8] | 1.2 | 1.2 | 1.2 |

TABLE 1A

| | Mixing Procedure (Parts by Weight) | |
|---|---|---|
| | Sample D | Sample E |
| Non-Productive Mixing Step | | |
| Synthetic PI[1] | 25 | 25 |
| SBR-HS rubber[2] | 37.5 | 50 |
| SIBR-SEG rubber[3] | 37.5 | 25 |
| Carbon black[4] | 45 | 45 |
| Antidegradants[5] | 3 | 3 |
| Processing oil[6] | 9 | 9 |
| Stearic acid | 3 | 3 |
| Zinc oxide | 3 | 3 |
| Wax[7] | 1 | 1 |
| Productive Mixing Step | | |
| Sulfur | 1.6 | 1.6 |
| Acclerators[8] | 1.2 | 1.2 |

[1]Synthetic cis 1,4-polyisoprene from The Goodyear Tire & Rubber Company as NATSYN® 2200.
[2]Solution polymerization prepared high styrene styrene/butadiene copolymer elastomer (referred to herein as SBR-HS) according to Example I, having about 37.5 weight percent bound styrene, a Mooney (ML-4) viscosity of about 72 and a Tg of about −22° C.
[3]Solution polymerization prepared segmented styrene/isoprene/butadiene terpolymer elastomer according to Example II, (referred to herein as SIBR-SEG) where the first 25 percent of the elastomer contains 100 weight percent units derived from isoprene and the last 75 percent of the elastomer contains 36 weight percent units as styrene and 64 weight percent as 1,3-polybutadiene, has a Mooney viscosity (ML-4) of about 73 and dual Tg's of −21° C. and −62° C.
[4]N299 carbon black, an ASTM designation.
[5]1.0 phr mixed diaryl p-phenylenediamine and 2 phr N-(1,3 dimethylbutyl)-N'-phenyl-p-phenylenediamine (6PPD).
[6]Paraffinic/naphthenic blend as Flexon 641 from Exxon.
[7]A 50/50 blend of paraffin and microcrystalline wax(s).
[8]Mixture of diphenylguanidine(0.4 phr) and N-oxydiethylene-2-benzothiazylsulfenamide (0.8 phr).

The rubber compositions of Example I were vulcanized for about 36 minutes at about 150° C. Physical properties are shown in the following Table 2 and Table 2A.

TABLE 2

| Property | Sample A | Sample B | Sample C |
|---|---|---|---|
| Monsanto Rheometer @ 150° C. | | | |
| Max. Torque, MPa | 34.8 | 37.4 | 36.6 |
| Min. Torque, MPa | 11.8 | 10.8 | 11.4 |
| T$_{90}$, minutes | 24.7 | 23.8 | 23.8 |
| Stress-Strain | | | |
| Tensile Strength, MPa | 12.7 | 17.2 | 14.1 |
| Elongation @ Break, % | 447 | 530 | 470 |
| 300% Modulus, MPa | 8.9 | 9.0 | 9.0 |

TABLE 2-continued

| Property | Sample A | Sample B | Sample C |
|---|---|---|---|
| Zwick Rebound | | | |
| 0° C., % | 13.6 | 7.8 | 9.6 |
| 23° C. % | 11.4 | 25.6 | 20.9 |
| 100° C., % | 55.2 | 59.4 | 59.2 |
| Rheovibron | | | |
| Tan Delta 0° C. | .410 | .430 | .440 |
| Tan Delta 60° C. | .127 | .114 | .120 |
| E' 0° C. | 224.0 | 27.4 | 62.9 |
| E' 60° C. | 16.3 | 12.4 | 13.7 |
| Din abrasion, 10 N | | | |
| Relative volume loss, cm$^3$ | 234 | 161 | 177 |

TABLE 2A

| Property | Sample D | Sample E |
|---|---|---|
| Monsanto Rheometer @ 150° C. | | |
| Max. Torque, MPa | 35.7 | 35.5 |
| Min. Torque, MPa | 11.2 | 11.5 |
| T$_{90}$, minutes | 23.5 | 23.6 |
| Stress-Strain | | |
| Tensile Strength, MPa | 13.9 | 13.0 |
| Elongation @ Break, % | 464 | 446 |
| 300% Modulus, MPa | 9.1 | 9.0 |
| Zwick Rebound | | |
| 0°0 C., % | 9.8 | 10.8 |
| 23° C. % | 18.0 | 15.7 |
| 100° C., % | 57.9 | 56.4 |
| Rheovibron | | |
| Tan Delta 0° C. | .430 | .440 |
| Tan Delta 60° C. | .121 | .119 |
| E' 0° C. | 92.0 | 123.0 |
| E' 60° C. | 14.1 | 14.0 |
| Din abrasion, 10 N | | |
| Relative volume loss, cm$^3$* | 191 | 114 |

*A relative volume loss is loss in cm$^3$ as compared to a standard control where a standard control is given a value of 100. All test samples are relative to control. Higher is worse, lower is better.

It can be readily seen from Table 2 and Table 2A that although Samples A through E have similar 300% modulus, Samples B–E have higher values for tensile strength which suggests improved durability when used as a tread compound in tires.

Samples B–E also exhibit lower rebound values at 0° C. and higher Tan.Delta values at 0° C. than Sample A which were predictive of improved traction performance in tires. Samples B–E also exhibit higher rebound at 100° C. and lower Tan.Delta at 60° C. which are predictive of improved (reduced) rolling resistance.

In addition, Samples B–E exhibit lower relative volume losses than Control A which is predictive of improved treadwear.

Further, the physical properties of Table 2 illustrate that it is possible to adjust the dynamic stiffness (E' at 0° C.) of a respective rubber composition to a large extent as might be desired in order to enhance handling property for a tire having a tread of the respective rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon 100 parts by weight rubber (phr), (A) about 25 to about 75 phr of styrene-rich segmented styrene/isoprene/butadiene terpolymer elastomer comprised of styrene/butadiene segments and polyisoprene segments and, correspondingly, about 25 to about 75 phr of at least one additional elastomer selected from at least one of cis 1,4-polyisoprene, styrene/butadiene copolymer, styrene/isoprene copolymer and 3,4-polyisoprene; wherein the content of the styrene/butadiene copolymer segments is in a range of about 15% to about 50% of the terpolymer and, correspondingly, the content of the polyisoprene segments is in a range of about 85% to about 50% of the terpolymer; wherein the styrene/butadiene segments are styrene-rich segments which contain about 20 to about 50 weight percent bound styrene; and wherein said segmented styrene/isoprene/butadiene terpolymer is characterized by having two Tg's, namely a first Tg of said styrene/butadiene segment in a range of about +10° C. to about −30° C. and a second Tg of said polyisoprene segments in a range of about −50° C. to about −70° C. and wherein said first and second Tg's are spaced apart by at least 20° C.

2. The rubber composition of claim 1 which contains from about 20 to about 120 phr of reinforcing filler selected from (1) rubber reinforcing carbon black or (2) rubber reinforcing carbon black and amorphous silica where said carbon black is present in an amount of about 5 to about 80 phr and said silica is present in an amount of about 5 to about 80 phr.

3. The rubber composition of claim 2 wherein said reinforcing filler is carbon black.

4. The rubber composition of claim 2 where said reinforcing filler is carbon black and amorphous silica where said carbon black is present in an amount of about 5 to about 80 phr and said silica is present in an amount of about 5 to about 80 phr wherein said rubber composition contains a coupling agent for said silica having a moiety reactive with hydroxyl groups on the surface of said silica and another moiety interactive with the said elastomer(s).

5. The rubber composition of claim 4 wherein said coupling agent is a bis (3-alkoxysilylalkyl) polysulfide having an average of from 2 to 2.6 or from 3.5 to 4 connecting sulfur atoms in its polysulfidic bridge.

6. The rubber composition of claim 4 wherein said coupling agent is a bis (3-ethoxysilylpropyl) polysulfide having an average of from 2 to 2.6 or from 3.5 to 4 connecting sulfur atoms in its polysulfidic bridge.

7. An article of manufacture having at least one component comprised of the rubber composition of claim 1.

8. An article of manufacture having at least one component comprised of the rubber composition of claim 2.

9. An article of manufacture having at least one component comprised of the rubber composition of claim 3.

10. An article of manufacture having at least one component comprised of the rubber composition of claim 4.

11. An article of manufacture having at least one component comprised of the rubber composition of claim 5.

12. An article of manufacture having at least one component comprised of the rubber composition of claim 6.

13. A tire having at least one component comprised of the rubber composition of claim 1.

14. A tire having at least one component comprised of the rubber composition of claim 2.

15. A tire having at least one component comprised of the rubber composition of claim 3.

16. A tire having at least one component comprised of the rubber composition of claim 4.

17. A tire having at least one component comprised of the rubber composition of claim 5.

18. A tire having at least one component comprised of the rubber composition of claim 6.

19. A tire having a tread comprised of the rubber composition of claim 1.

20. A tire having a tread comprised of the rubber composition of claim 2.

21. A tire having a tread comprised of the rubber composition of claim 3.

22. A tire having a tread comprised of the rubber composition of claim 4.

23. A tire having a tread comprised of the rubber composition of claim 5.

24. A tire having a tread comprised of the rubber composition of claim 6.

* * * * *